(12) United States Patent
Oura et al.

(10) Patent No.: US 6,589,689 B2
(45) Date of Patent: Jul. 8, 2003

(54) NON-AQUEOUS ELECTROLYTE SECONDARY BATTERY AND METHOD FOR PRODUCING THE SAME

(75) Inventors: Takafumi Oura, Hirakata (JP); Kazuya Iwamoto, Sakai (JP); Atsushi Ueda, Osaka (JP); Hiroshi Yoshizawa, Hirakata (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 185 days.

(21) Appl. No.: 09/829,044

(22) Filed: Apr. 10, 2001

(65) Prior Publication Data

US 2001/0053474 A1 Dec. 20, 2001

(30) Foreign Application Priority Data

Apr. 11, 2000 (JP) ........................................ 2000-109267

(51) Int. Cl.$^7$ ........................ H01M 2/16; H01M 10/04; H01M 10/40
(52) U.S. Cl. ...................... 429/137; 429/332; 429/342; 429/343; 29/623.1
(58) Field of Search ................................ 429/137, 332, 429/342, 343, 330, 331; 29/623.1, 623.5

(56) References Cited

U.S. PATENT DOCUMENTS 5,626,981 A    5/1997  Simon et al.
5,972,055 A  * 10/1999 Gao et al. .................. 29/623.5

FOREIGN PATENT DOCUMENTS

| JP | 8-45545 | | 2/1996 | |
| JP | 09 007897 A | * | 1/1997 | .......... H01G/9/038 |
| JP | 2000 012080 A | * | 1/2000 | .......... H01M/10/40 |
| JP | 2000 040526 A | * | 2/2000 | |

OTHER PUBLICATIONS

"The Behavior of Lithium Electrodes in Mixtures of Alkyl Carbonates and Ethers", by Aurbach et al., J. Electrochem. Soc., vol. 138, No. 12 (Dec. 1991), pp. 3529–3536.

* cited by examiner

Primary Examiner—Patrick Ryan
Assistant Examiner—Gregg Cantelmo
(74) Attorney, Agent, or Firm—McDermott, Will & Emery

(57) ABSTRACT

For providing a non-aqueous electrolyte secondary battery having excellent storage characteristics when stored in the charged state under a high temperature condition, the non-aqueous electrolyte or the negative electrode is made to contain divinylethylene carbonate, thereby to form a film derived from divinylethylene carbonate on the surface of the negative electrode material.

14 Claims, No Drawings

NON-AQUEOUS ELECTROLYTE SECONDARY BATTERY AND METHOD FOR PRODUCING THE SAME

BACKGROUND OF THE INVENTION

The present invention relates to a non-aqueous electrolyte secondary battery. To be specific, the invention relates to a non-aqueous electrolyte secondary battery having an excellent stability in the charged state under a high temperature condition.

In recent years, there has been a rapid advancement in the realization of small, lightweight and cordless electronic appliances such as personal computers and portable telephones. As a power source for these appliances, secondary batteries having a high energy density have been required. In particular, non-aqueous electrolyte secondary batteries using lithium as an active material have been attracting a great deal of attention as batteries having a high voltage and a high energy density.

In order to obtain a non-aqueous electrolyte secondary battery having a high energy density and excellent characteristics, the characteristics of the non-aqueous electrolyte which transports lithium ions is critical. The non-aqueous solvent in the non-aqueous electrolyte usually comprises a solvent having a large dielectric constant which means facilitating dissolution of solutes, and a solvent having a low viscosity which is highly capable of transporting ions.

Usable solvents having a large dielectric constant are, for example, cyclic carbonic acid esters such as ethylene carbonate and propylene carbonate. Also, usable solvents having a low viscosity are non-cyclic carbonic acid esters such as dimethyl carbonate, diethyl carbonate and ethyl methyl carbonate.

The non-aqueous electrolyte prepared by dissolving a solute such as $LiPF_6$ in such a mixed solvent has a high ionic conductivity and can be adapted to a discharge under a low temperature of around 0° C., for example.

However, when the battery is stored in the charged state, there arise such problems as a decrease in the battery capacity due to the self-discharging and an increase in the inner pressure of the battery due to generation of gas. To be specific, on the negative electrode, the non-aqueous solvent is decomposed by the cathodic reduction reaction to generate gas. At this time, since lithium in the negative electrode is also reacted, the self discharge is accelerated and the battery capacity is decreased. In the case where a carbon material such as graphite is used as the negative electrode active material, the self-discharging is increased compared to the case where coke and the like is used, and the decrease in the capacity becomes explicit.

It is reported that, when ethylene carbonate is used as the non-aqueous solvent, ethylene carbonate is subjected to ring-opening dimerization, and it forms a film in the passive state on the surface of the negative electrode active material (J. Electrochem. Soc., 138, Aurbach et al., p. 3529). This film serves as a barrier which suppresses the decomposition of the non-aqueous solvent during storage of the battery in the charged state at around room temperature. However, since the film derived from ethylene carbonate is thermally unstable, it decomposes under a high temperature condition. As a consequence, when the battery in the charged state is stored under a high temperature condition, the decomposition reaction of the non-aqueous solvent in the battery cannot be suppressed.

Also studied is addition of vinylene carbonate having one carbon—carbon double bond in the molecule to the non-aqueous electrolyte. Vinylene carbonate has a good solubility with ethylene carbonate, and further, it is considered that vinylene carbonate preferentially forms a film on the surface of the negative electrode material (Japanese Laid-Open Patent Publication No. Hei 8-45545). Nevertheless, the film derived from vinylene carbonate is not sufficiently stable with heat and it also decomposes when the battery in the charged state is stored under a high temperature condition of 60 to 80° C. For such a reason, it is difficult to sufficiently suppress the decomposition reaction of the non-aqueous solvent by conventional techniques.

BRIEF SUMMARY OF THE INVENTION

In view of such circumstances as above, the present invention provides a non-aqueous electrolyte secondary battery having an excellent stability even when it is stored in the charged state under a high temperature condition.

The present invention relates to a non-aqueous electrolyte secondary battery comprising: a positive electrode; a negative electrode; and a non-aqueous electrolyte comprising a non-aqueous solvent and a solute dissolved therein, wherein the negative electrode material has on its surface a film derived from divinylethylene carbonate. The film derived from divinylethylene carbonate has an excellent thermal stability and allows lithium ions to permeate therethrough readily.

Also, the present invention relates to a non-aqueous electrolyte secondary battery comprising: a positive electrode; a negative electrode; and a non-aqueous electrolyte comprising a non-aqueous solvent and a solute dissolved therein, wherein the non-aqueous solvent contains divinylethylene carbonate.

It is preferable that the non-aqueous solvent comprises at least one selected from the group consisting of a carbonic acid ester and a carboxylic acid ester. Herein, the carbonic acid ester means those except divinylethylene carbonate.

The carbonic acid ester is preferably at least one selected from the group consisting of ethylene carbonate, propylene carbonate, butylene carbonate, vinylene carbonate, ethyl methyl carbonate, diethyl carbonate and dimethyl carbonate.

The carboxylic acid ester is preferably at least one selected from the group consisting of γ-butyrolactone, γ-valerolactone, α-acetyl-γ-butyrolactone, α-methyl-γ-butyrolactone, α-bromo-γ-butyrolactone, methyl acetate, ethyl acetate, methyl propionate, ethyl butylate, butyl acetate, n-propyl acetate, iso-butyl propionate and benzyl acetate.

The amount of divinylethylene carbonate is preferably 0.5 to 20 parts by volume per 100 parts by volume of the non-aqueous solvent.

A preferable non-aqueous solvent comprises 100 parts by volume of at least one selected from the group consisting of ethylene carbonate, propylene carbonate, butylene carbonate and vinylene carbonate, and 250 to 350 parts by volume of at least one selected from the group consisting of ethyl methyl carbonate, diethyl carbonate and dimethyl carbonate.

Another preferable non-aqueous solvent comprises 100 parts by volume of at least one selected from the group consisting of γ-butyrolactone, γ-valerolactone, α-acetyl-γ-butyrolactone, α-methyl-γ-butyrolactone and α-bromo-γ-butyrolactone, and 250 to 350 parts by volume of at least one selected from the group consisting of methyl acetate, ethyl acetate, methyl propionate, ethyl butylate, butyl acetate, n-propyl acetate, iso-butyl propionate and benzyl acetate.

It is also preferable that 90% by volume or more of the non-aqueous solvent consists of at least one selected from the group consisting of ethylene carbonate, propylene carbonate, butylene carbonate and vinylene carbonate.

It is still also preferable that 90% by volume or more of the non-aqueous solvent consists of at least one selected from the group consisting of γ-butyrolactone, γ-valerolactone, α-acetyl-γ-butyrolactone, α-methyl-γ-butyrolactone and α-bromo-γ-butyrolactone.

It is preferable that the positive electrode material contained in the positive electrode comprises a transition metal oxide containing lithium and that the negative electrode material contained in the negative electrode comprises a carbon material. The carbon material preferably comprises graphite.

Also, the present invention relates to a method for producing a non-aqueous electrolyte secondary battery comprising the steps of:

preparing a positive electrode material mixture containing a positive electrode material and applying the positive electrode material mixture to a core member to form a positive electrode plate;

preparing a negative electrode material mixture containing 100 parts by weight of a negative electrode material and 0.5 to 20 parts by weight of divinylethylene carbonate, and applying the negative electrode material mixture to a core member to form a negative electrode plate;

dissolving a solute into a non-aqueous solvent to prepare a non-aqueous electrolyte; and constructing a non-aqueous electrolyte secondary battery using the positive electrode plate, the negative electrode plate and the non-aqueous electrolyte thus obtained.

While the novel features of the invention are set forth particularly in the appended claims, the invention, both as to organization and content, will be better understood and appreciated, along with other objects and features thereof, from the following detailed description taken in conjunction with the drawings.

DETAILED DESCRIPTION OF THE INVENTION

A non-aqueous electrolyte secondary battery having excellent storage characteristics when stored in the charged state under a high temperature condition can be achieved by adding an appropriate amount of divinylethylene carbonate to the non-aqueous electrolyte.

The structure of divinylethylene carbonate is shown by the general formula (1).

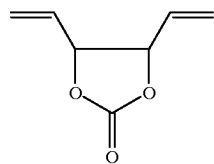

(1)

Divinylethylene carbonate has two carbon—carbon double bond in the molecule and polymerizes by reduction via these double bonds. Thereafter, ring-opening dimerization proceeds as in the case of ethylene carbonate. As a result, a film is formed on the surface of the negative electrode material. This film is closer, stronger and more excellent in the thermal stability than a film derived from ethylene carbonate, or vinylene carbonate having only one carbon—carbon double bond in the molecule. The film derived from divinylethylene carbonate does not decompose even under a high temperature condition and effectively suppresses the self-discharging of the battery during storage at a high temperature.

In the case where divinylethylene carbonate is added to the non-aqueous electrolyte, divinylethylene carbonate moves to the negative electrode side with the solvent and forms a film on the surface of the negative electrode material. If an appropriate amount of divinylethylene carbonate is contained in the non-aqueous electrolyte, a film is formed regardless of the amount contained.

Divinylethylene carbonate may be contained in the negative electrode or in the positive electrode. In such a case, divinylethylene carbonate elutes from the positive or negative electrode material mixtures into the non-aqueous solvent with a lapse of time. As a consequence, the similar results can be obtained as in the case where the non-aqueous electrolyte is made to contain divinylethylene carbonate. In order to efficiently form the film with the use of a small amount of divinylethylene carbonate, it is effective to mix divinylethylene carbonate beforehand into the negative electrode material mixture.

As the non-aqueous solvents, a cyclic carbonic acid ester, a non-cyclic carbonic acid ester, a cyclic carboxylic acid ester, a non-cyclic carboxylic acid ester and the like are used, as they do not readily decompose by oxidation or reduction. These solvents may be used singly or in combination of two or more of them.

In case of using a mixture of a cyclic carbonic acid ester and a non-cyclic carbonic acid ester, it is preferable to mix 100 parts by volume of a cyclic carbonic acid ester and 250 to 350 parts by weight of a non-cyclic carbonic acid ester. This enables easy dissolution of a solute in die non-aqueous solvent and thereby improves the discharge characteristics of the battery at a low temperature. In the same manner, in case of using a mixture of a cyclic carboxylic acid ester and a non-cyclic carboxylic acid ester, it is preferable to mix 100 parts by volume of a cyclic carboxylic acid ester and 250 to 350 parts by volume of a non-cyclic carboxylic acid ester.

A cyclic carbonic acid ester or a cyclic carboxylic acid ester may be used as the main component of the non-aqueous solvent. For example, a non-aqueous solvent of which 90% by volume or more consists of a cyclic carbonic acid ester or a cyclic carboxylic acid ester is superior in the resistance to oxidation compared with a non-aqueous solvent comprising a non-cyclic carbonic acid ester or a non-cyclic carboxylic acid ester as the main component.

However, the non-aqueous solvents comprising a cyclic carbonic acid ester or a cyclic carboxylic acid ester are readily decomposed by reduction and, in particular, cyclic carboxylic esters are readily reduced. The use of these non-aqueous solvents is difficult without addition of divinylethylene carbonate.

The cyclic carbonic acid esters include ethylene carbonate, propylene carbonate, butylene carbonate and vinylene carbonate. They may be used singly or in combination of two or more of them. Among them, ethylene carbonate and propylene carbonate are preferred from the viewpoint that they dissolve solutes well and have a large dielectric constant.

The non-cyclic carbonic acid esters include ethyl methyl carbonate, diethyl carbonate and dimethyl carbonate. They may be used singly or in combination of two or more of them. Among them, ethyl methyl carbonate is preferred from the viewpoint that it has a high ionic conductivity and that, if it is used, smaller amount of gas generates during storage at a high temperature. The non-cyclic carbonic acid esters are usually used as mixed with cyclic carbonic esters.

The cyclic carboxylic acid esters include γ-butyrolactone, γ-valerolactone, α-acetyl-γ-butyrolactone, α-methyl-γ-butyrolactone and α-bromo-γ-butyrolactone. They may be used singly or in combination of two or more of them. Among them, γ-butyrolactone is preferred in view of its good ionic conductivity.

The non-cyclic carboxylic acid esters include methyl acetate, ethyl acetate and methyl propionate. They are usually used as mixed with cyclic carboxylic acid esters. They may be used singly or in combination of two or more of them.

Although γ-butyrolactone, propylene carbonate and the like are, by nature, decomposed readily on the negative electrode containing a carbon material such as graphite, they are preferable in view of their large dielectric constant and low melting point. Addition of divinylethylene carbonate enables only such preferable properties to be displayed because the decomposition of these solvents is suppressed.

Divinylethylene carbonate is preferably added in an amount of 0.5 to 20 parts by volume per 100 parts by volume of the non-aqueous solvent. When the amount of divinylethylene carbonate is less than 0.5 parts by volume, a thermally stable film is not sufficiently formed on the surface of the negative electrode material; when the amount is more than 20 parts by volume, excessive film is formed to inhibit the electrode reaction. The amount of divinylethylene carbonate added to the non-aqueous solvent is more preferably 0.5 to 10 parts by volume per 100 parts by volume of the non-aqueous solvent from the viewpoint of forming a film of an appropriate thickness on the surface of the negative electrode material and not harming intrinsic properties of the electrolyte.

In the case where the negative electrode material mixture is made to contain divinylethylene carbonate beforehand, the amount of the divinylethylene carbonate is preferably 0.5 to 20 parts by weight per 100 parts by weight of the negative electrode material.

As the negative electrode material, it is preferable to use a material capable of absorbing and desorbing lithium. The materials capable of absorbing and desorbing lithium include carbon materials such as a thermally decomposed carbon, coke, graphite, 4 glassy carbon, a calcined matter of an organic polymer compound, a carbon fiber, an activated carbon, polymers such as polyacetylene, polypyrrole, and polyacene, transition metal oxides containing lithium such as $Li_{4/3}Ti_{5/3}O_4$, alloys, intermetallic compounds, and transition metal sulfides such as $TiS_2$. Among them, carbon materials are suitable. For example, a graphite having a structure in which the spacing of (002) lattice planes is 0.340 nm or less is preferable from the viewpoint of improving the energy density of the battery. The average particle size of the carbon materials is preferably 10 to 30 μm.

The intermetallic compounds include a compound of a transition metal and silicon, and a compound of a transition metal and tin. Among them, a compound of nickel and silicon, and a compound of titanium and silicon are preferable.

It is preferable to further add to the negative electrode material 1 to 3 parts by weight of a binder and 50 to 150 parts by weight of a viscosity controlling agent per 100 parts by weight of the negative electrode material, thereby to form a negative electrode material mixture in a form of a paste. As the binder, styrene-butadiene rubber, polyvinyliden fluoride and the like are preferably used. Also, as the viscosity controlling agent, N-methyl-2-pyrrolidone and an aqueous solution containing carboxymethyl cellulose and the like are preferably used. The negative electrode material mixture obtained is applied to a core member such as a current collector by a known method to give a negative electrode plate.

In the following, preferred examples of formulating non-aqueous solvents and divinylethylene carbonate will be described.

Embodiment 1

5 to 10 parts by volume of divinylethylene carbonate is added to 100 parts by volume of the non-aqueous solvent obtained by mixing 250 to 350 parts by volume of ethyl methyl carbonate with 100 parts by volume of ethylene carbonate.

Embodiment 2

5 to 10 parts by volume of divinylethylene carbonate is added to 100 parts by volume of γ-butyrolactone.

Solutes to be dissolved in the non-aqueous solvent are not specifically restricted in the present invention and those generally used in the non-aqueous electrolyte secondary batteries can be used. To be specific, $LiClO_4$, $LiAsF_6$, $LiPF_6$, $LiBF_4$, $LiCF_3SO_3$, $LiN(CF_3SO_2)_2$, $LiN(C_2F_5SO_2)_2$, $LiN(CF_3SO_2)(C_4F_9SO_2)$, $LiC(CF_3SO_2)_3$ and the like are used. These solutes may be used singly or in combination of two or more of them. The amount of the solutes to be added to the non-aqueous solvent may be the same as in the conventional manner. For example, 1 to 1.5 mol/l is suitable.

As the positive electrode material, from the viewpoint of increasing the battery capacity and the energy density, a compound oxide containing at least one transition metal and lithium, i.e. a so-called transition metal oxide containing lithium is preferably used as the main component. For example, suitable is an active material comprising a transition metal oxide containing lithium represented by $Li_xMO_2$, in which M is at least one transition metal, and generally $0.05 \leq x \leq 1.10$, although x depends on the charged state of the battery.

In this $Li_xMO_2$, the transition metal M is preferably at least one selected from the group consisting of Co, Ni and Mn. Also, $Li_xMn_2O_4$ can be used. The positive electrode material is preferably used as mixed with a conductive agent. Further, it is preferred to add a binder and a viscosity controlling agent to the positive electrode material as in the case of the negative electrode material mixture.

Possible shapes of the battery include cylindrical, square, coin and button types. The present invention can be applied to batteries in any shape.

Next, the present invention will be more specifically described with reference to examples, which, however, are not construed to limit the scope of the invention.

Described in the following is the positive electrode, the negative electrode, the separator and the non-aqueous electrolyte, which are used in the examples and the comparative examples, and the cylindrical non-aqueous electrolyte secondary battery of 18650 type having a diameter of 18 mm and a height of 65 mm, which is constructed using these constituting members. Also, the test method of the battery will be described.

(i) Positive Electrode

As the positive electrode material, $LiCoO_2$ was used. To 100 parts by weight of $LiCoO_2$, 3 parts by weight of acetylene black as a conductive agent, 7 parts by weight of polytetrafluoroethylene as a binder and 100 parts by weight of an aqueous solution containing 1% by weight of carboxymethyl cellulose as a viscosity controlling agent were added and mixed to give a positive electrode material mixture in the form of a paste. The positive electrode material mixture was applied onto both surfaces of an aluminum foil having a thickness of 30 μm and dried. This was pressed with a roller and was cut into a predetermined size to give a positive electrode plate.

(ii) Negative Electrode

As the negative electrode material, flake graphite having an average particle size of about 20 μm was used. To 100 parts by weight of the flake graphite, 3 parts by weight of styrene-butadiene rubber as a binder and 100 parts by weight of an aqueous solution containing 1% by weight of carboxymethyl cellulose as a viscosity controlling agent were added and mixed to give a negative electrode material mixture in the form of a paste. The negative electrode material mixture was applied onto both surfaces of a copper foil having a thickness of 20 μm and was dried. This was pressed with a roller and was cut into a predetermined size to give a negative electrode plate.

(iii) Separator

A microporous film made of polyethylene having a thickness of 25 μm was used as a separator.

(iv) Non-Aqueous Electrolyte

LiPF$_6$ as a solute was dissolved in the non-aqueous solvent prepared in the following examples and comparative examples in a concentration of 1.5 mol/l to give a non-aqueous electrolyte.

(v) Construction of the Battery

First, the positive electrode plate and the negative electrode plate were laminated with the band-like separator interposed therebetween, and these were spirally rolled up together to form an electrode assembly. A positive electrode lead made of aluminum and a negative electrode lead made of nickel were welded respectively to the positive electrode plate and the negative electrode plate. After a ring-like insulating plate made of a polyethylene resin was disposed on the bottom of the electrode assembly, the electrode assembly was housed in a battery case made of iron whose inner surface is nickel-plated. The other end of the negative electrode lead was passed through the hole in the center of the insulating plate and spot-welded to the inner bottom surface of the battery case. After another insulating plate made of a polyethylene resin was mounted on the top of the electrode assembly, a groove was provided in a given position close to the opening edge of the battery case, and a given amount of the non-aqueous electrolyte was poured into the battery case. Next, a sealing plate made of stainless steel provided with a gasket made of a polypropylene resin in its circumference was prepared. After the other end of the positive electrode lead was spot-welded to the lower surface of the sealing plate, the sealing plate was fixed to the opening edge of the battery case via the gasket. Thereafter, the opening edge of the battery case was made to be crimped with the circumference of the sealing plate to complete the battery. The capacity of the battery was 1500 mAh.

(vi) Test Method of the Battery

In the course of 2.5 hours, the battery thus constructed was charged at a constant current of 1050 mA (0.7 C) at 20° C. until the battery voltage reached 4.2 V, and then the battery was supplementary charged at a constant voltage of 4.2 V. Next, the battery in the charged state was discharged at a constant current of 1050 mA at 20° C. until the battery voltage reached 3.0 V. Subsequently, the battery was again charged at a constant current of 1050 mA and the battery in the charged state was stored at 60° C. for 10 days. Then, the battery after storage was discharged at 20° C. in the same manner as before storage. The discharge capacity maintenance rate after storage was determined by the formula (1).

Capacity maintenance rate (%)=(discharge capacity after storage/discharge capacity before storage)×100    Formula (1)

EXAMPLES 1 TO 8 AND COMPARATIVE EXAMPLES 1 TO 8

Using the non-aqueous solvent as shown in Table 1, batteries 1 to 16 were constructed in the aforementioned manner and the capacity maintenance rate of each battery was determined. Divinylethylene carbonate was not added to the non-aqueous solvent used in the batteries 1 to 8, and divinylethylene carbonated was added to the non-aqueous electrolyte used in the batteries 9 to 16 in an amount of 5 parts by volume per 100 parts by volume of the non-aqueous solvent. The batteries 1 to 8 correspond respectively to Comparative Examples 1 to 8 and the batteries 9 to 16 correspond respectively to Examples 1 to 8 the results are shown in Table 1.

TABLE 1

|  | without DVEC | | with DVEC | |
| --- | --- | --- | --- | --- |
| a* | Battery | b** | battery | b |
| EC/EMC = 25/75 | 1 | 70% | 9 | 87% |
| EC/DMC = 25/75 | 2 | 65% | 10 | 85% |
| PC = 100 | 3 | —*** | 11 | 57% |
| GBL = 100 | 4 | — | 12 | 85% |
| GVL = 100 | 5 | — | 13 | 81% |
| α-acetyl-GBL = 100 | 6 | — | 14 | 80% |
| α-methyl-GBL = 100 | 7 | — | 15 | 87% |
| α-bromo-GBL = 100 | 8 | — | 16 | 79% |

*non-aquesou solvent (the numerical valve indicates % by volume of each component of the solvent)
**capacity maintenance rate after storage
***not able to be charged and discharged In Table 1, abbreviations used are as follows:
DVEC: divinylethylene carbonate, EC: ethylene carbonate, EMC: ethyl methyl carbonate, DMC: dimethyl carbonate, PC: propylene carbonate, GBL: γ-butyrolactone,
GVL: γ-valerolactone, α-acetyl-GBL: α-acetyl-γ-butyrolactone,
α-methyl-GBL: α-methyl-γ-butyrolactone, and
α-bromo-GBL: α-bromo-γ-butyrolactone.

As is understood from Table 1, in the case where a mixed solvent comprising ethylene carbonate, which is a cyclic carbonic acid ester, and a non-cyclic carbonic acid ester, the capacity maintenance rate of the batteries 1 and 2 to which no divinylethylene carbonate was added is around 70%. On the other hand, the capacity maintenance rate of the batteries 9 and 10 to which 5 parts by volume of divinylethylene carbonate was added per 100 parts by volume of the non-aqueous solvent is respectively 87% and 85%, which is a remarkable improvement.

The batteries 3 to 8 to which no divinylethylene carbonate was added were not able to be charged and discharged. This is presumably because propylene carbonate or cyclic carboxylic acid esters decomposed therein. On the other hand, the batteries 11 to 16 to which 5 parts by volume of divinylethylene carbonate was added per 100 parts by volume of the non-aqueous solvent were able to carry out charge/discharge reaction. This is presumably because a close and strong film was formed on the surface of the negative electrode material by divinylethylene carbonate to suppress the decomposition of the non-aqueous solvent. Also, since this film was thermally stable, the capacity maintenance rate after storage under a high temperature condition was as high as 80 to 90%, despite some exceptions, and it was almost equal to that of the batteries 9 and 10.

From the results as above, it is clear that addition of divinylethylene carbonate to the non-aqueous electrolyte remarkably improves the storage characteristics of the battery in the charged state under a high temperature condition.

However, oxidation decomposition potential of divinylethylene carbonate is low as 5.0 V to the potential of Li. For this reason, addition in an excessive amount of divinylethylene carbonate might generate gas by its oxidative decomposition. Therefore, the amount to be added of divinylethylene carbonate was examined as next.

EXAMPLES 9 TO 26

Batteries 17 to 25 using a mixed solvent of 25% by volume of ethylene carbonate and 75% by volume of ethyl methyl carbonate as shown by EC/EMC in Table 2 were constructed. EC/EMC was the same solvent as the one used in the battery 1. Also, batteries 26 to 34 using γ-butyrolactone as shown by GBL in Table 2 were constructed. GBL was the same solvent as the one used in the battery 4.

Herein, to the non-aqueous electrolyte of each battery, divinylethylene carbonate (DVEC) was added in the amount shown in Table 2. Then the capacity maintenance rate of each battery was determined. The batteries 17 to 34 correspond respectively to Examples 9 to 26. The results are shown in Table 2.

TABLE 2

| battery | d**** | b** | battery | e***** | b |
|---------|-------|-----|---------|--------|---|
| 17 | 0.1 | 71% | 26 | 0.1 | —*** |
| 18 | 0.3 | 73% | 27 | 0.3 | 45% |
| 19 | 0.5 | 80% | 28 | 0.5 | 81% |
| 20 | 1.0 | 83% | 29 | 1.0 | 84% |
| 21 | 5.0 | 89% | 30 | 5.0 | 85% |
| 22 | 10 | 87% | 31 | 10 | 87% |
| 23 | 20 | 87% | 32 | 20 | 86% |
| 24 | 25 | 67% | 33 | 25 | 58% |
| 25 | 30 | 30% | 34 | 30 | 28% |

**capacity maintenance rate after storage
***not able to be charged and discharged
****part(s) by volume of DVEC added to 100 part by volume of EC/EMC
*****part(s) by volume of DVEC added to 100 parts by volume of GBL In Table 2, little improvement was observed on the capacity maintenance rate of the batteries 17 and 18 where 0.3% by volume or less of divinylethylene carbonate was added to the mixed solvent of ethylene carbonate and ethyl methyl carbonate. This suggested that a thermally stable film was not sufficiently formed. Also, the batteries 24 and 25 where respectively 25% by volume and 30% by volume of divinylethylene carbonate was added to the mixed solvent showed a decrease in the capacity maintenance rate after storage. This was presumably because excessive film was formed to increase the polarization during the discharge.

In the case where γ-butyrolactone was used as the non-aqueous solvent, the battery 26 where 0.1% by volume of divinylethylene carbonate was added to the solvent was not able to carry out charge/discharge reaction sufficiently. This was presumably because the reductive decomposition of γ-butyrolactone was not sufficiently suppressed. Further, the battery 27 where 0.3% by volume of divinylethylene carbonate was added to the solvent was presumably unable to sufficiently suppress the reductive decomposition of γ-butyrolactone and the capacity maintenance rate was decreased therein. Also, the battery 33 and 34 where respectively 25% by volume and 30% by volume of divinylethylene carbonate was added to the solvent showed a decrease in the capacity maintenance rate after storage. This was presumably because excessive film was formed on the surface of the negative electrode material. On the other hand, the batteries 19 to 23 and 28 to 32 where 0.5 to 20 parts by volume of divinylethylene carbonate was added to the solvent exhibited a good capacity maintenance rate.

From above, it is found that suitable amount of divinylethylene carbonate is 0.5 to 20 parts by volume per 100 parts by volume of the non-aqueous solvent.

As a consequence, it is understood that, according to the present invention, provided is a non-aqueous electrolyte secondary battery having excellent storage characteristics when stored in the charged state under a high temperature condition.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

What is claimed is:

1. A non-aqueous electrolyte secondary battery comprising:
   a positive electrode;
   a negative electrode; and
   a non-aqueous electrolyte comprising a non-aqueous solvent and a solute dissolved therein,
   wherein said non-aqueous electrolyte contains divinylethylene carbonate,
   wherein said non-aqueous solvent comprises 100 parts by volume of at least one selected from the group consisting of ethylene carbonate, propylene carbonate, butylene carbonate and vinylene carbonate, and 250 to 350 parts by volume of ethyl methyl carbonate, diethyl carbonate and dimethyl carbonate.

2. The non-aqueous electrolyte secondary battery in accordance with claim 1,
   wherein the amount of divinylethylene carbonate is 0.5 to 20 parts by volume per 100 parts by volume of said non-aqueous solvent.

3. The non-aqueous electrolyte secondary battery in accordance with claim 1,
   wherein said positive electrode includes a transition metal oxide containing lithium and said negative electrode includes a carbon material.

4. A non-aqueous electrolyte secondary battery comprising:
   a positive electrode;
   a negative electrode; and
   a non-aqueous electrolyte comprising a non-aqueous solvent and a solute dissolved therein,
   wherein said non-aqueous electrolyte contains divinylethylene carbonate,
   wherein said non-aqueous solvent comprises 100 parts by volume of at least one selected from the group consisting of γ-butyrolactone, γ-valerolactone, α-acetyl-γ-butyrolactone, α-methyl-γ-butyrolactone and α-bromo-γ-butyrolactone, and 250 to 350 parts by volume of at least one selected from the group consisting of methyl acetate, ethyl acetate, methyl propionate, ethyl butylate, butyl acetate, n-propyl acetate, iso-butyl propionate and benzyl acetate.

5. The non-aqueous electrolyte secondary battery in accordance with claim 4, wherein amount of divinylethylene carbonate is 0.5 to 20 parts by volume per 100 parts by volume of said non-aqueous solvent.

6. The non-aqueous electrolyte secondary battery in accordance with claim 4, wherein said positive electrode includes a transition metal oxide containing lithium and said negative electrode includes a carbon material.

7. A non-aqueous electrolyte secondary battery comprising:

a positive electrode;

a negative electrode; and a non-aqueous electrolyte comprising a non-aqueous solvent and a solute dissolved therein, wherein said non-aqueous electrolyte contains divinylethylene carbonate, wherein 90% by volume or more of said non-aqueous solvent consists of at least one selected from the group consisting of ethylene carbonate, propylene carbonate, butylene carbonate and vinylene carbonate.

8. The non-aqueous electrolyte secondary battery in accordance with claim 7, wherein the amount of divinylethylene carbonate is 0.5 to 20 parts by volume per 100 parts by volume of said non-aqueous solvent.

9. The non-aqueous electrolyte secondary battery in accordance with claim 7, wherein said positive electrode includes a transition metal oxide containing lithium and said negative electrode includes a carbon material.

10. A non-aqueous electrolyte secondary battery comprising:

a positive electrode;

a negative electrode; and a non-aqueous electrolyte comprising a non-aqueous solvent and a solute dissolved therein, wherein said non-aqueous electrolyte contains divinylethylene carbonate, wherein 90% by volume or more of said non-aqueous solvent consists of at least one selected from the group consisting of γ-butyrolactone, γ-valerolactone, α-acetyl-γ-butyrolactone, α-methyl-γ-butyrolactone and α-bromo-γ-butyrolactone.

11. The non-aqueous electrolyte secondary battery in accordance with claim 10, wherein the amount of divinylethylene carbonate is 0.5 to 20 parts by volume per 100 parts by volume of said non-aqueous solvent.

12. The non-aqueous electrolyte secondary battery in accordance with claim 10, wherein said positive electrode includes a transition metal oxide containing lithium and said negative electrode includes a carbon material.

13. A method for producing a non-aqueous electrolyte secondary battery comprising the steps of:

preparing a positive electrode material mixture including a positive electrode material, and applying said positive electrode material mixture to a core member to form a positive electrode plate;

preparing a negative electrode material mixture containing 100 parts by weight of a negative electrode material and 0.5 to 20 parts by weight of divinylethylene carbonate, and applying said negative electrode material mixture to a core member to form a negative electrode plate;

dissolving a solute into a non-aqueous solvent to prepare a non-aqueous electrolyte; and constructing a non-aqueous electrolyte secondary battery using said positive electrode plate, said negative electrode plate and said non-aqueous electrolyte.

14. The method for producing a non-aqueous electrolyte secondary battery in accordance with claim 13, wherein said positive electrode material comprises a transition metal oxide containing lithium and said negative electrode material comprises a carbon material.

* * * * *